United States Patent Office 2,903,358
Patented Sept. 8, 1959

2,903,358

MODIFIED MILK

Richard J. Block, Scarsdale, N.Y., and Gunter Zweig, Yellow Springs, Ohio, assignors to The Borden Company, a corporation of New Jersey No Drawing. Application November 15, 1956
Serial No. 622,263

4 Claims. (Cl. 99—54)

This invention relates to modified milk and particularly to the removal of a minor component that we have found to be largely, if not entirely, responsible for the development of off-flavor (heated taste) at the elevated temperatures of sterilizing and drying milk for human consumption.

The temperature limitations in such processing are well known and have long been carefully observed. In pasteurizing, for instance, the temperature and time are so regulated as to give a passable reduction in bacterial count with minimum development of off-flavor. The heated taste development is more pronounced in canned milk which must be sterilized so that it will keep for long periods of time.

We have now discovered that the removal from milk of lactalbumen including the beta-lactoglobulin component of the lactalbumen, in advance of the heating to said elevated temperatures, eliminates most of the taste sensitivity of the milk to the elevated temperatures. Once the lactalbumen has been removed, at a temperature below that at which the heated taste develops, then the remainder of the milk components may be canned or spray dried with satisfactory taste stability. Also, the modified milk made as described herein is useful as a food particularly for those persons for whom lactalbumen or the beta-lactoglobulin thereof is allergenic.

Briefly stated, our invention comprises the process of and the product resulting from separating casein from cow's milk in a usual manner, contacting the resulting whey with a precipitant for lactalbumen, separating the precipitate so formed from the remainder of the whey, maintaining the milk and subsequently the whey at all times up to and through the separation of the precipitated lactalbumen at a temperature below that of the development of the objectionable heated taste, and then remixing the whey from which the lactalbumen has been thus separated with casein or other food protein.

The final result is a reconstituted milk less substantially all of the lactalbumen as, for instance, less about 90% or more of the original content.

The milk used by us is skimmed cow's milk that has not been heated to a temperature to develop a level of taste that is objectionable for the purpose for which the finished product is to be used. Ordinarily we use pasteurized skimmed milk.

The casein is removed in usual manner, as by acidification of the milk to a pH of around 4.55 by the addition of the necessary proportion of dilute aqueous mineral or organic acid such as hydrochloric, sulfuric, phosphoric, lactic, acetic, or citric acid. Then the casein is separated, suitably by filtration or centrifugation in any usual manner. The filtrate or whey so obtained contains a total of about 0.5% of lactalbumen of which the beta-lactoglobulin constitutes approximately 60% corresponding to approximately 0.3% of the weight of the whey. The beta-lactoglobulin and the other components also of the lactalbumen are then precipitated from the whey by a chemical precipitant therefor. Thus, the initial separation of the casein and the precipitation of the lactalbumen are effected to advantage, as described in U.S. Patent 2,710,858, issued to Block and Bolling, on June 14, 1955. For example, the filtrate from the acid precipitation of casein from skimmed milk is contacted with ferric ion of ferric chloride or like salt at a pH of 3.5–4.5 and suitably about 4.05 and in amount to precipitate the lactalbumen. This leaves a whey that, after separation of the precipitated lactalbumen as ferrilactin), gives no precipitate when tested for protein with trichloroacetic acid solution.

In place of the separation procedure as described for casein and for lactalbumen, there may be used any other conventional process of separating these ingredients from whey, provided the temperature is kept low, as below 50°–55° C. throughout the said separations. Thus we may use a rennin process casein. Also we may precipitate the lactalbumen by the use of other chemical precipitants than the ferric salt, as, for instance, ferrous ion oxidized to ferric ion after being brought into contact with the whey as described in U.S. Patent 2,754,292, issued July 10, 1956, to Henderson and Block, the gel of ferric or aluminum hydroxide, soluble zinc or cadmium salts such as the chlorides, or potassium perchlorate or perfluoroctanoate.

In order to avoid hazard or extreme complications in the proportioning and processing of the precipitant, we use to advantage the non-toxic materials of which the iron compounds are illustrative, economical, and satisfactory.

The precipitated lactalbumen including the beta-lactoglobulin are separated by filtration in accordance with usual technique for filtering precipitates away from liquids or as described in the said patent. Excess iron in the filtrate is removed in any convenient manner, as by passage of the filtrate through a bed of granular cation exchange material, suitably on a water insoluble inert backing or supporting material such as a resin. This type of granular reactant, when used, is held in a tower or other equipment of conventional type (not shown). The effluent from the tower is neutralized, as with sodium hydroxide, to pH 6.5–10, by the addition of non-toxic acid or alkali, as required.

After the precipitated lactalbumen has been separated, the remaining liquid, representing whey less the lactalbumen so precipitated and separated and being the effluent with the adjusted pH, is reconstituted as a modified milk. Thus the original casein content of the milk may be reblended into the modified whey and the whole adjusted to pH 6.5–7 by adding non-toxic acid or alkali as required. To make a whole milk less the lactalbumen removed, butter or other fat also is introduced, as in normal proportion, and homogenized along with other additional materials if any that are desired in proportions other than those remaining in the modified whey as, for instance, additional amount of minerals, vitamins, and amino acids.

The product so made may be pasteurized and sold in liquid form, evaporated and sterilized at usual milk canning temperatures, or spray dried. There is less development of the heated taste or off-flavor, the two terms being used more or less interchangeably herein, with our modified product at the selected elevated temperature of processing than with milk containing the usual proportion of lactalbumen.

The invention will be further illustrated by description in connection with the following specific examples of the practice of it, proportions in these examples and elsewhere herein being expressed as parts by weight unless specifically stated to the contrary.

Example 1

1 liter of skimmed milk was acidified to pH 4.55 with 6 N hydrochloric acid. The casein was removed by filtration on cheese cloth and washed several times with water.

To the whey thus obtained, 20 ml. of 1 M ferric chloride solution were added. The pH was 3.7 at this point. The precipitate of ferrilactin so formed was removed by filtration. The protein free whey was then adjusted to pH 8. This may be effected by the addition of an alkali such as dilute sodium hydroxide or carbonate, to remove extra iron as ferric hydroxide or carbonate. The neutralization of the protein free whey may be effected also by contact with a basic anion exchange resin, of which Amberlite IR-410 in the basic ($OH^-$ or the $CO_3^=$) cycle is representative, this resin being understood to be a phenol formaldehydepolyamine condensate, and the resin being removed from the protein free whey by filtration.

The casein isolated above, 2 ml. of cream, and the lactalbumen freed whey were intimately mixed in a Waring Blender. The reconstituted modified milk so made was then passed through a laboratory type homogenizer and the pH was adjusted to 6.8 with sodium hydroxide.

This product, when pasteurized, as at 71.2° C. (160° F.) for 15 seconds, retains substantially the same taste as before the pasteurizing.

In one form of this example, the whey modified by removal of the lactalbumen and subsequent reconstitution is subjected to spray drying to give a powdered product.

In another form of this example, the modified whey is mixed and homogenized with the normal proportion of casein and also with any edible fat of animal or vegetable origin or to both in amount to adjust the fat content of the reconstituted "milk" to any desired level.

Example 2

The reconstituted modified milk of Example 1 (but without the introduction of cream) was mixed with additional components in amount required to give a hypoallergenic food including the components in the proportions shown below, all on the dry basis.

| Ingredient | Percent In Food, dry basis |
| --- | --- |
| Reconstituted modified milk (condensed to 21% to 26.5% solids) | 33.2 |
| Lactose | 38.4 |
| Palm Oil | 13.2 |
| Coconut Oil | 6.6 |
| Peanut Oil | 6.6 |
| Lecithin | 1.0 |
| Vitamins, flavoring materials, etc., as desired. | |

The hypoallergenic food so made possesses the added advantages of taste stability on warming to pasteurization temperatures and substantial freedom from lactalbumen, the proportion of which on the dry basis is less than about 0.2%.

It is to be understood that it is intended to cover all changes and modifications of the examples of the invention herein chosen for the purpose of illustration which do not constitute departures from the spirit and scope of the invention.

What is claimed is:

1. In making a milk of decreased development of objectionable flavor on being heated to the elevated temperature of sterilization and spray drying, the process which comprises separating the casein from skimmed cow's milk, contacting the resulting whey with a non-toxic soluble ferric salt precipitant for lactalbumen in amount to cause precipitation of at least 90% of the lactalbumen of the whey, filtering the lactalbumen so precipitated from the remainder of the whey, the milk and subsequently the whey being maintained at all times up to and through the said filtering at a temperature below that of substantial development of a heated taste, and then remixing the whey so separated from the lactalbumen with casein so as to give a reconstituted milk less lactalbumen.

2. In making a milk of decreased development of objectionable flavor on being heated to the elevated temperature of sterilization and spray drying, the process which comprises separating the casein from skim milk, contacting the resulting whey with a non-toxic water soluble ferric salt precipitant for lactalbumen in amount to cause precipitation of at least 90% of the lactalbumen of the whey, admixing with the whey from which the lactalbumen has been so precipitated an alkali in amount to precipitate any excess of the ferric salt, filtering the lactalbumen and any iron compound so precipitated from the remainder of the whey, the milk and the whey being maintained at all times up to and through the said filtering at a temperature below that of substantial development of a heated taste, and then remixing the whey so separated from the lactalbumen with casein so as to give a reconstituted milk less lactalbumen.

3. The process of claim 2 in which the said metal salt is a ferric salt.

4. The process of claim 1, the said ferric salt being added in amount to precipitate the lactalbumen substantially completely so that the content of lactalbumen in the whey after the said filtering is not precipitable by trichloroacetic acid solution.

References Cited in the file of this patent

UNITED STATES PATENTS

| Re. 1,306 | Borden | May 13, 1862 |
| 2,710,858 | Block et al. | June 14, 1955 |
| 2,754,292 | Henderson et al. | July 10, 1956 |